(12) United States Patent
Bennett et al.

(10) Patent No.: US 7,798,344 B2
(45) Date of Patent: Sep. 21, 2010

(54) TARPING SYSTEM

(75) Inventors: Ronald W. Bennett, Florence, SC (US); Anthony J. Cook, Florence, SC (US)

(73) Assignee: Aluminum Ladder Company, Florence, SC (US)

( * ) Notice: Subject to any disclaimer, the term of this patent is extended or adjusted under 35 U.S.C. 154(b) by 195 days.

(21) Appl. No.: 12/103,211

(22) Filed: Apr. 15, 2008

(65) Prior Publication Data

US 2009/0256380 A1   Oct. 15, 2009

(51) Int. Cl.
*B60P 7/04* (2006.01)
(52) U.S. Cl. ............................ 212/328; 212/271; 296/98
(58) Field of Classification Search ................ 212/328, 212/271; 296/98
See application file for complete search history.

(56) References Cited

U.S. PATENT DOCUMENTS

| 4,243,147 A | * | 1/1981 | Twitchell et al. ............ 212/284 |
| 5,125,280 A | | 6/1992 | Koscinski et al. .......... 74/89.15 |
| 5,948,985 A | * | 9/1999 | Brautigan et al. ............. 73/622 |
| 5,957,523 A | * | 9/1999 | Haddad, Jr. .................. 296/98 |
| 6,070,313 A | * | 6/2000 | O'Brian ....................... 29/240 |
| 6,502,709 B1 | | 1/2003 | Parker ......................... 212/328 |

FOREIGN PATENT DOCUMENTS

| JP | 7-144573 A | * | 6/1995 |
| SU | 743932 B | * | 7/1980 |

* cited by examiner

*Primary Examiner*—Thomas J. Brahan
(74) *Attorney, Agent, or Firm*—John B. Hardaway, III; Nexsen Pruet, LLC

(57) ABSTRACT

An apparatus is provided for tarping a cargo loaded on a flat bed vehicle which includes a pair of ruggedly constructed double scissors linkages carried by an overhead horizontal traveling trolley and connectable at their lower ends to the tarpaulin. A vertically adjustable horizontal roller is provided, over which the tarpaulin is pulled during its installation in covering relation to the loaded cargo.

15 Claims, 11 Drawing Sheets

US 7,798,344 B2

TARPING SYSTEM

BACKGROUND OF THE INVENTION

Flatbed transport vehicles and trailers transport payloads that need to be covered to protect the cargo from the sun, rain, snow, dust and the like. It is common practice to use a heavy sturdy tarpaulin cover which is releasably secured to the transport vehicles and is repeatedly reused to cover various cargo typically transported on flat bed vehicles. Because of the weight of the tarpaulin cover, manual installation and removal requires the services of several men and it is a time consuming operation and physically demanding. A proposed power operated tarping apparatus is shown in U.S. Pat. No. 6,502,709.

BRIEF SUMMARY OF THE INVENTION

The herein disclosed tarping apparatus has a number of advantages over the tarping apparatus illustrated in U.S. Pat. No. 6,502,709. It is designed for heavy duty. It is particularly well suited for indoor installation with suspension from a suspended overhead beam. The overhead beam serves as a support and guiding tracking for a trolley supporting a vertically retractable lifting mechanism attachable to the forward end of the tarpaulin. The lifting mechanism is comprised of two laterally spaced scissors linkages depending from opposite ends of a horizontal hanger secured to the trolley. The lift linkages move from raised folded positions to extended lower positions by a pair of horizontally disposed linear power actuators. In tarping a flat bed trailer a tarpaulin roller carrier is lowered from the overhead beam to a position back of the trailer. The trolley supported scissors linkages are moved to the rear end of the trailer just ahead of the tarpaulin roller carrier and is lowered so the end of the tarpaulin can be manually passed over the horizontal roller on the carrier and connected to the lower ends of the lift linkages. The scissor linkages are raised above the height of the load being tarped and is moved forward sufficiently to permit the guide roller carrier to be raised so that the guide roller is above the height of the payload on the trailer. The guide roller carrier includes a horizontal protection bar parallel to and below the guide roller. The guide roller carrier is releasably to the lateral sides of the transport trailer with the protection roller positioned to bear against the upper rear portion of the load. The protection roller thus positioned prevents the tarpaulin from being dragged across the upper rear edge of the load, thus avoiding damage to the tarpaulin.

BRIEF DESCRIPTION OF THE DRAWINGS

One embodiment of the tarping apparatus is shown in the accompanying drawings, in which.

DETAILED DESCRIPTION OF THE DRAWINGS

Figure 1:
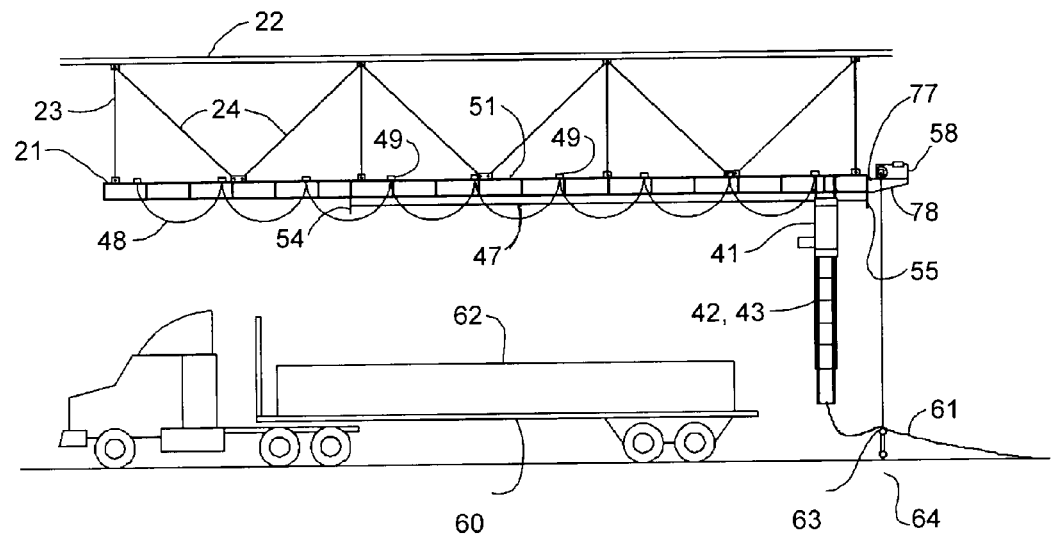
FIG. 1 is a side view showing a flat bed trailer carrying cargo awaiting tarping by the tarping apparatus of this invention.
Figure 3:
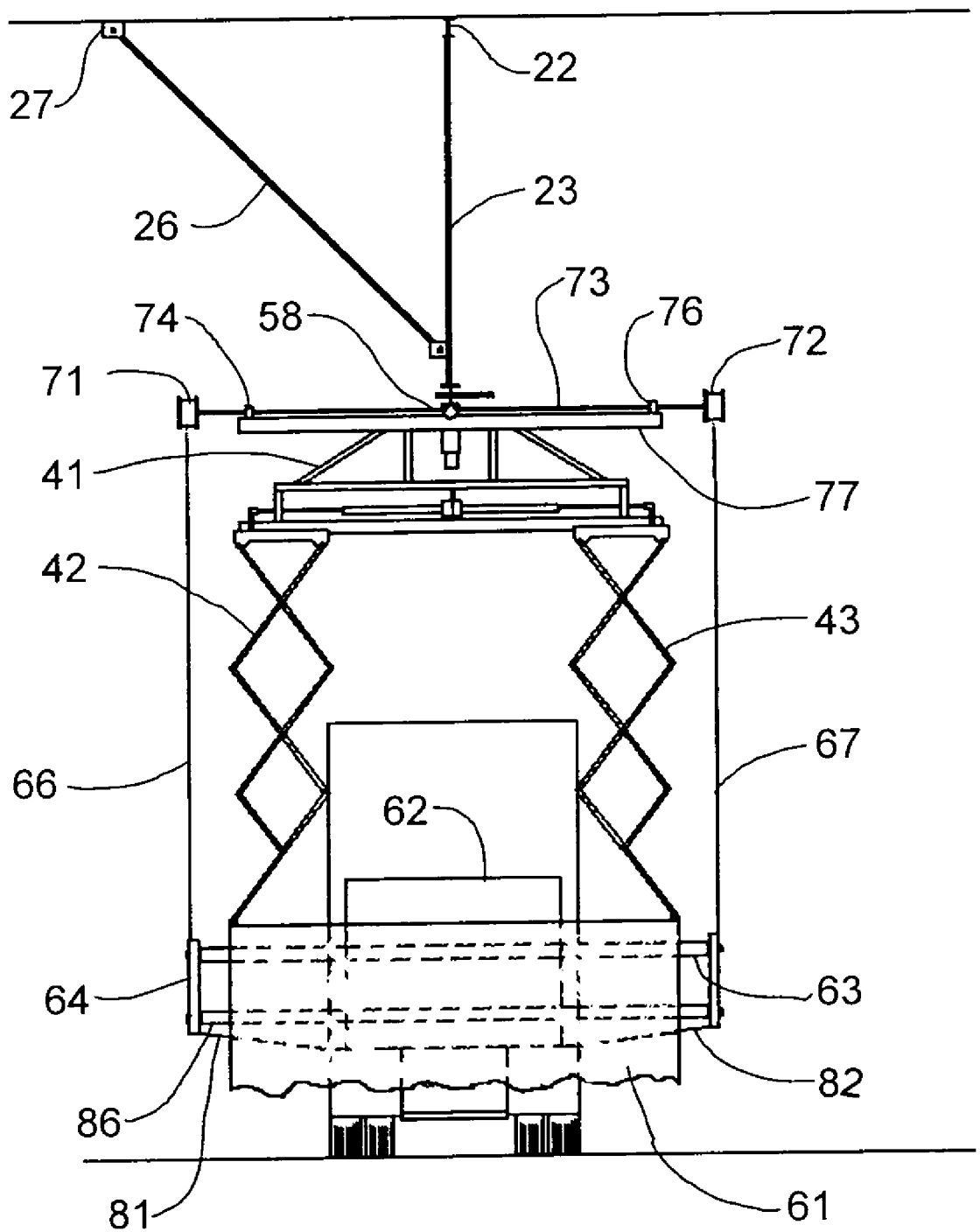
FIG. 3 is a rear view of the apparatus down in FIG. 2 showing the cargo being tarped.
Figure 4:
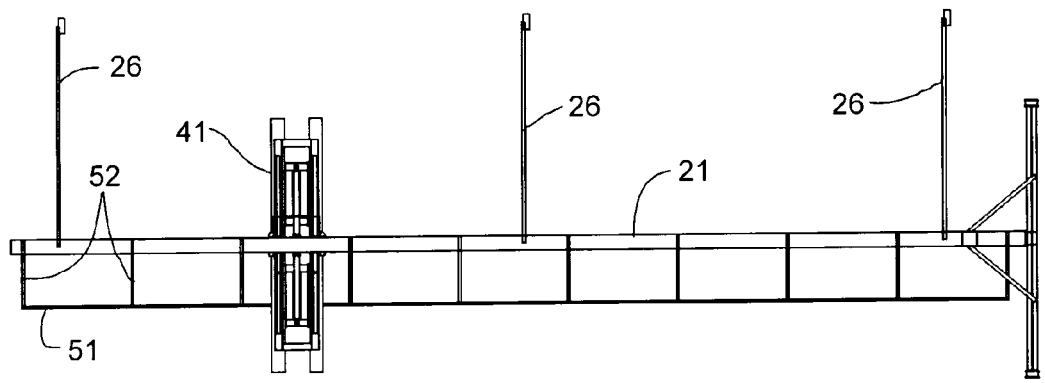
FIG. 4 is a top view of the apparatus of this invention.
Figure 6:
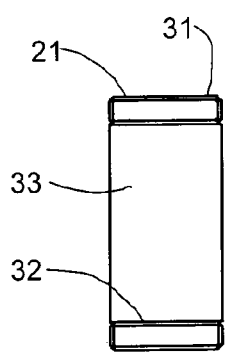
FIG. 6 is a section taken on line 6-6 in FIG. 5.
Figure 5:
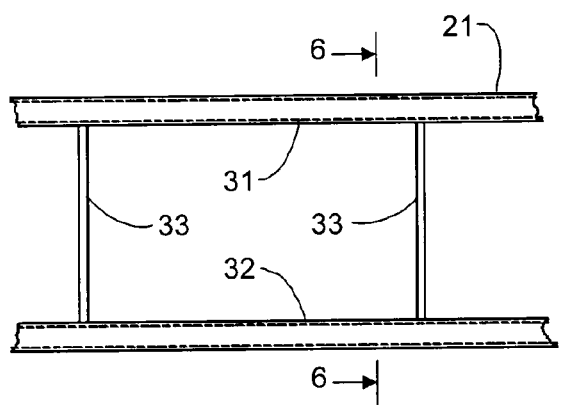
FIG. 5 is a partial side view of the overhead track for supporting the tarping apparatus.

The transport vehicle load tarping apparatus illustrated in the drawings is preferably an indoor or sheltered facility which includes an elongated horizontal overhead track 21 which is suspended from a horizontal beam 22 by vertical supports 23 and diagonal struts 24. As shown in FIGS. 3 and 4, side sway preventing bars 26 are interconnected between the track 21 and an overhead beam 27. As shown in FIGS. 5 and 6 the track 21 includes upper and lower parallel hollow frame members 31, 32 of rectangular cross section rigidly interconnected by a series of vertical struts 33 spaced at equal horizontal intervals from one another. The struts 33 extend laterally the full horizontal width of the hollow frame members 31, 32. The overhead track supports a motorized trolley 41 from which a pair of double scissors linkages 42, 43 are suspended. The trolley 41 is driven by an electric motor 44, shown in FIG. 10, which through a speed reducer 45, drives a sprocket 46 engaging a drive chain or chain belt 47 passing over idler sprockets 48 and secured at its opposite ends to a pair of stationary mounts 54, 55 on the underside of the overhead track 21, as shown in FIG. 1. Electric power is transmitted to the electric motor 44 by a festoon hung electrical line 48 supported by a plurality of small traveling carriages 49 supported on a horizontal guide rail 51, which in turn is supported by a plurality of horizontal supports 52 secured to and extending laterally from the overhead track 21.

Figure 2:
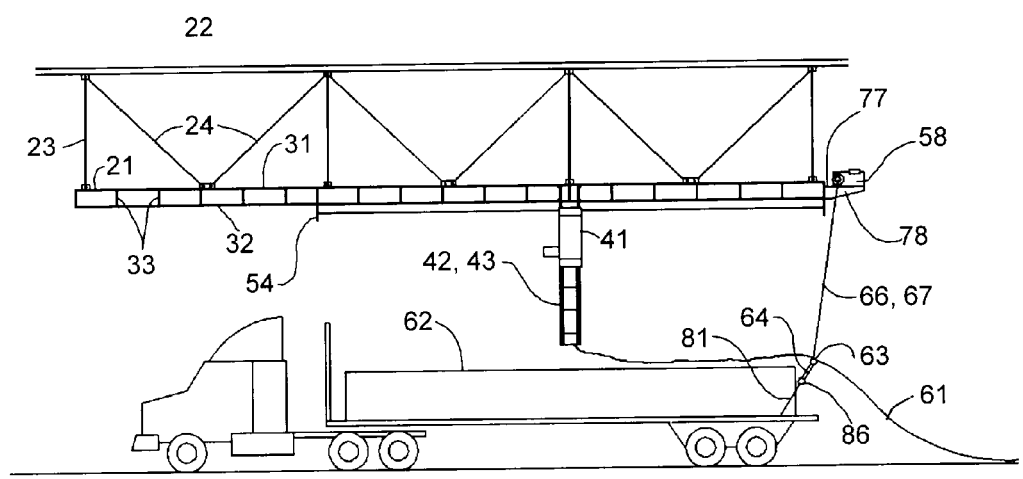
FIG. 2 is a side view of the apparatus of FIG. 1 showing the cargo being tarped.

As shown in FIG. 1, the double linkages 42, 43 may be extended to ground level for easy connection to the forward end of a tarpaulin 61, when the trolley 41 is moved to the rear of the flat bed vehicle or trailer 60 whose load is being tarped. In order to protect the tarpaulin 61 as it is pulled forward over the load 62 the tarpaulin is passed over a horizontally disposed roller 63 on a roller frame 64 supported by a pair of cables 66, 67 extending downward from a pair of reels 71, 72 rigidly secured to laterally opposite ends of a horizontal reel shaft 73 rotatably supported on journal boxes 74, 76 mounted on a laterally extending horizontal beam 77 rigidly secured to the track 27, as shown in FIG. 3. The reel shaft 73 is driven by an electric motor 58 mounted on a bracket 78 welded to the beam 77. After the forward corners of the tarpaulin 61 are connected to the lower ends of the double scissors lift linkages 42, 43, the left linkages 42, 43 are raised by retracting them and the roller frame 64 is raised to prevent the tarpaulin 61 from being drug across sharp corners or objects of the load being tarped. The roller frame 64 is releasably secured to opposite sides of the bed of the trailer 60, near its rear end, by tie down chains 81, 82. As shown in FIG. 2, the roller frame 64 is positioned so that a horizontal protection bar 86 bears against the upper rear of the load, thereby maintaining the roller 63 in the correct position for preventing the tarpaulin 61 from being drug across the upper rear of the load 62. When tarping a load of irregular contour the roller frame 64 can be raised to a higher position to prevent the tarpaulin 61 from being snagged on protruding parts of the transported cargo, in which event longer tie down chains would be used in connecting the roller frame 64 to the rear of the trailer 60. In using the tarping apparatus of this invention the tarpaulin 61 is kept in an elevated position above the transported cargo as it is moved forward into position to be lowered in covering relation to the cargo.

Figure 12:
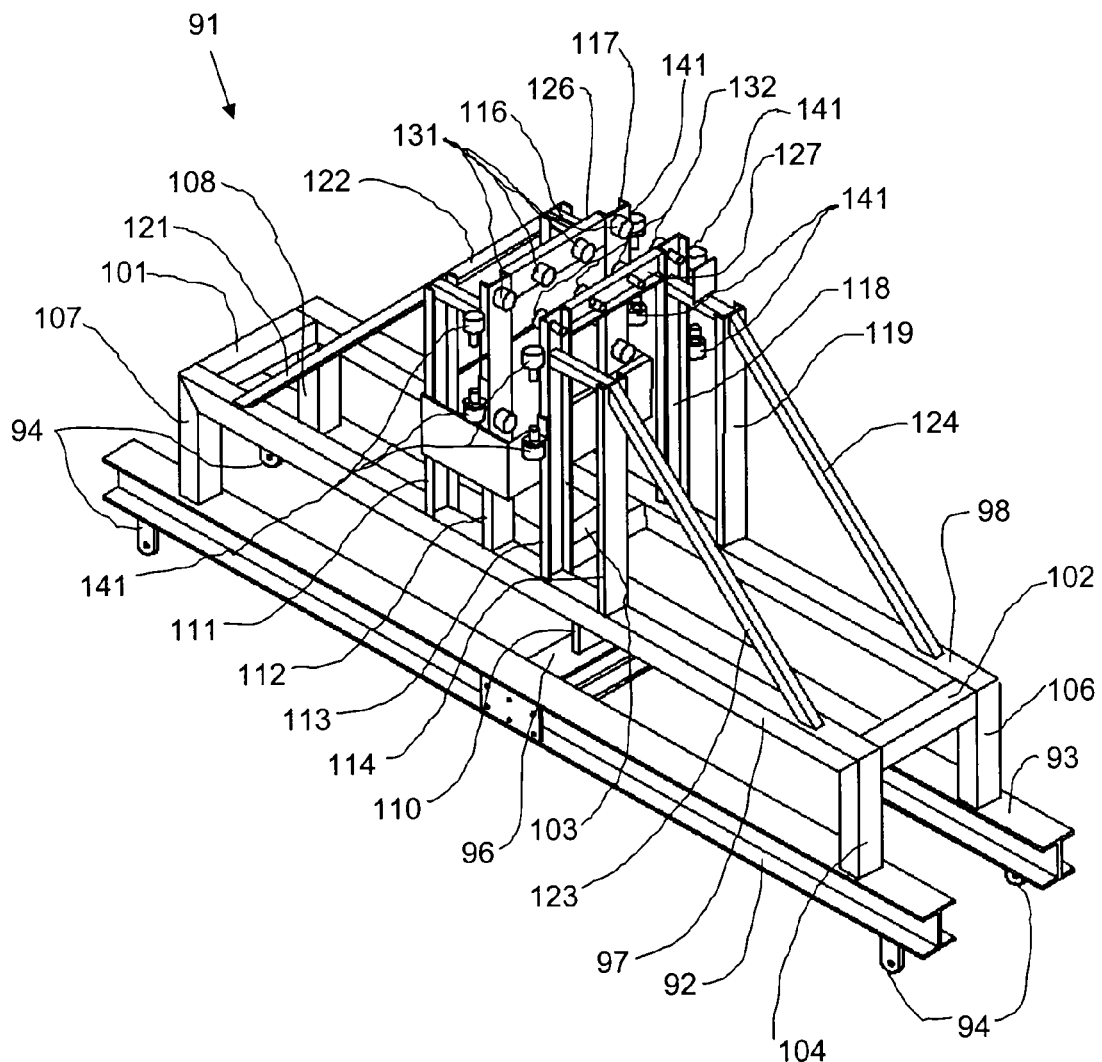
FIG. 12 is a perspective showing a scissor troller.

The tarpaulin 61 is heavy and when manually applied to a trailer load it requires the services of too many workers for too long a period of time. The scissors linkages 42, 43 and the trolley 41 are strongly built so as to efficiently elevate and move the tarpaulin into a cargo covering position. The track 21 has a substantial cross section and the trolley frame 91 shown in FIG. 12, is a very sturdy construction. The trolley frame 91 includes a pair of parallel horizontal H beams 92, 93 extending laterally with downwardly extending scissors suspension brackets 94 welded to their opposite ends. A tie beam 96 extends between and is welded to the H beams 93, 94 at their mid section. An upper weldment is provided which includes a pair of horizontal parallel supports 97, 98 interconnected at their corresponding ends by struts 101, 102 and centrally by a strut 103. The parallel supports are mounted on the H beams by leg members 104, 106, 107, 108. A vertical actuator mounting plate 110 has its upper and lower ends welded to the strut 103 and the tie beam 96, respectively. A roller supporting framework is provided having uprights 111, 112, 113, 114, 116, 117, 118, 119, diagonal braces 121, 122, 123, 124, and horizontal connectors 126, 127. The roller supporting framework supports two sets of four top vertical load bearing rollers 131, 132, respectively, two sets of two bottom rollers, and eight side thrust rollers 141.

Figure 8:
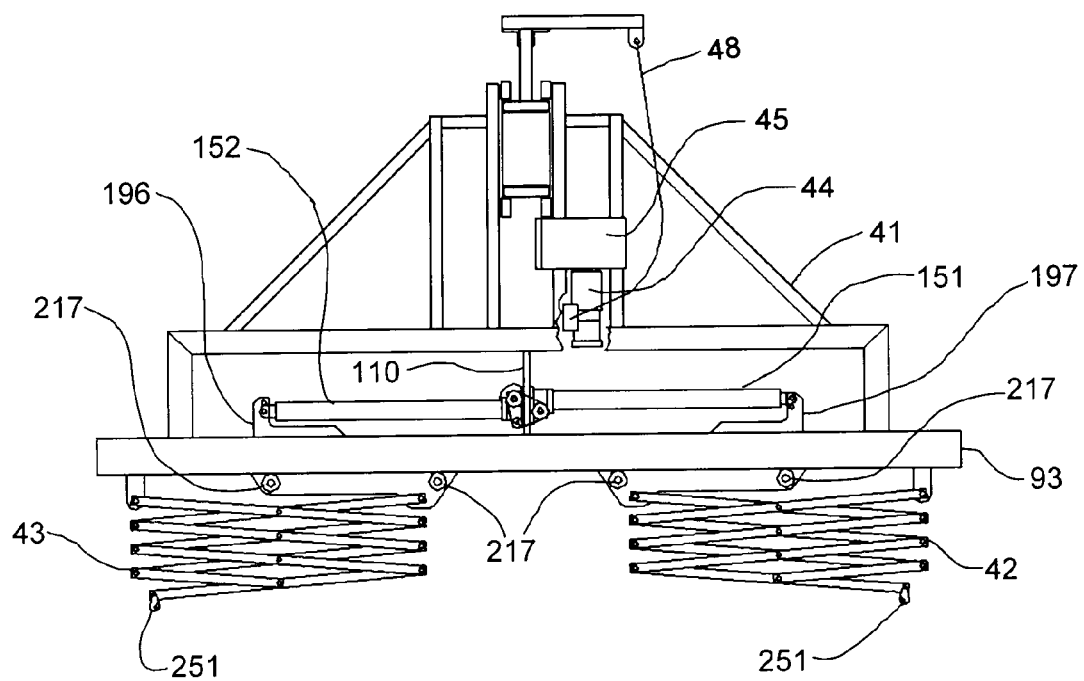
FIG. 8 is an enlarged end view of the trolley and the scissors lift linkage in its raised position.
Figure 9:
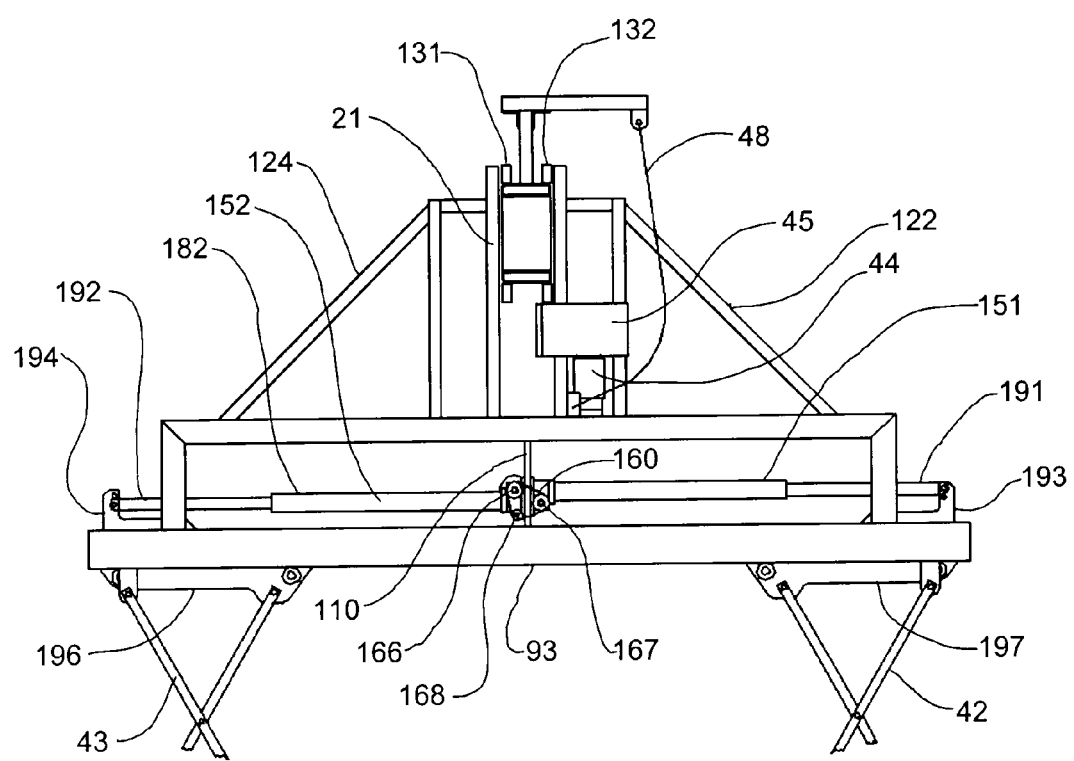
FIG. 9 is an end view showing the scissors linkages extended by the linear actuators.
Figure 10:
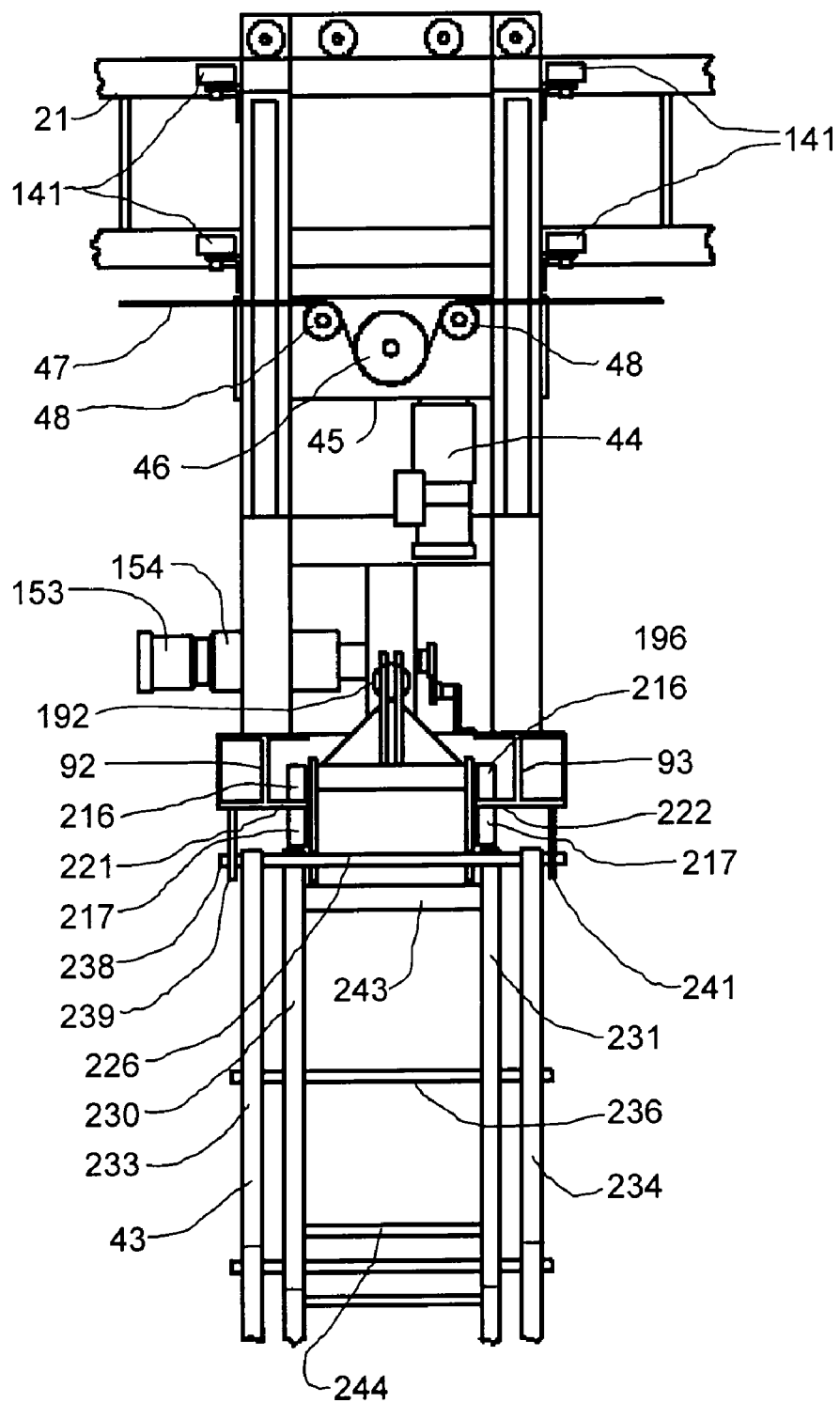
FIG. 10 is a side view of the track, trolley and part of the scissors linkage.
Figure 11:
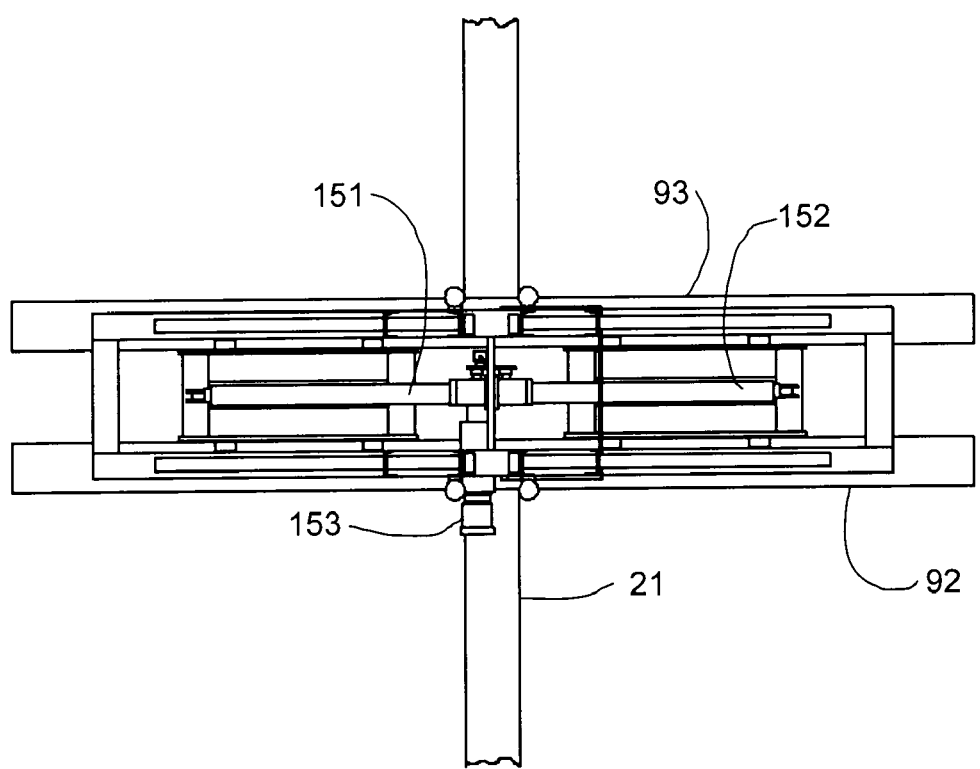
FIG. 11 is a top view of the trolley with parts broken away for illustration purposes.
Figure 13:
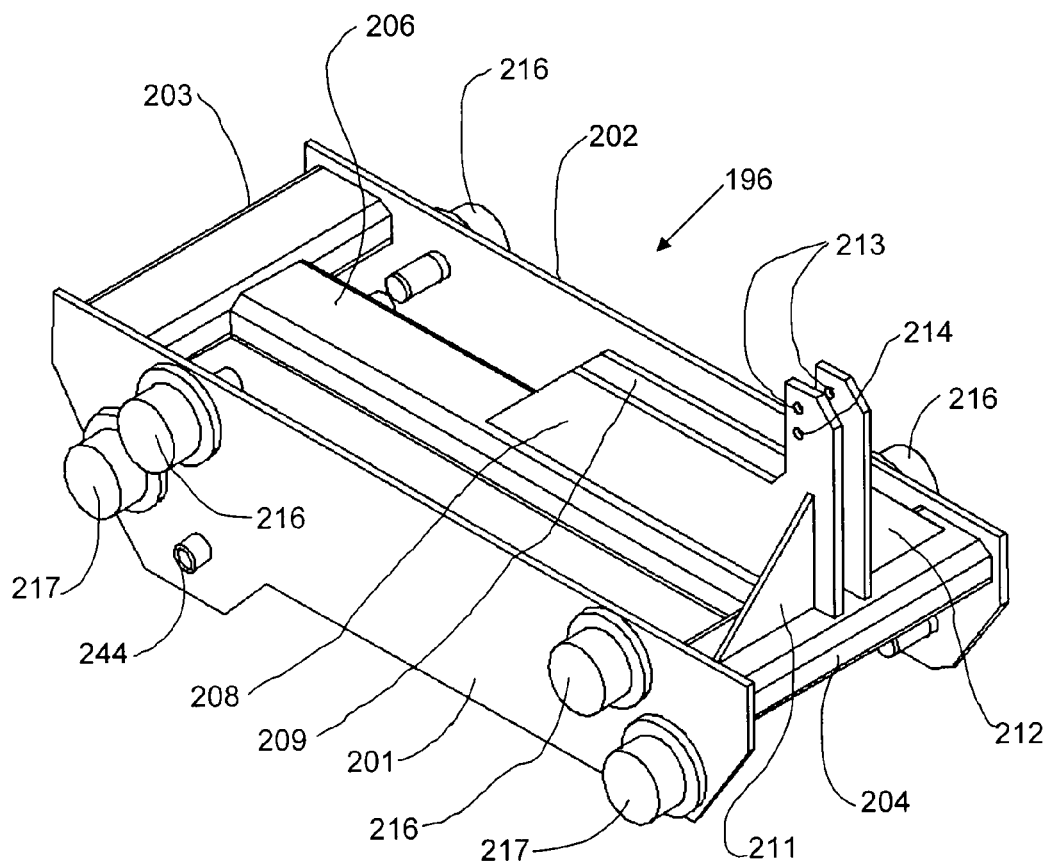
FIG. 13 is a perspective of the trolley frame.
Figure 14:
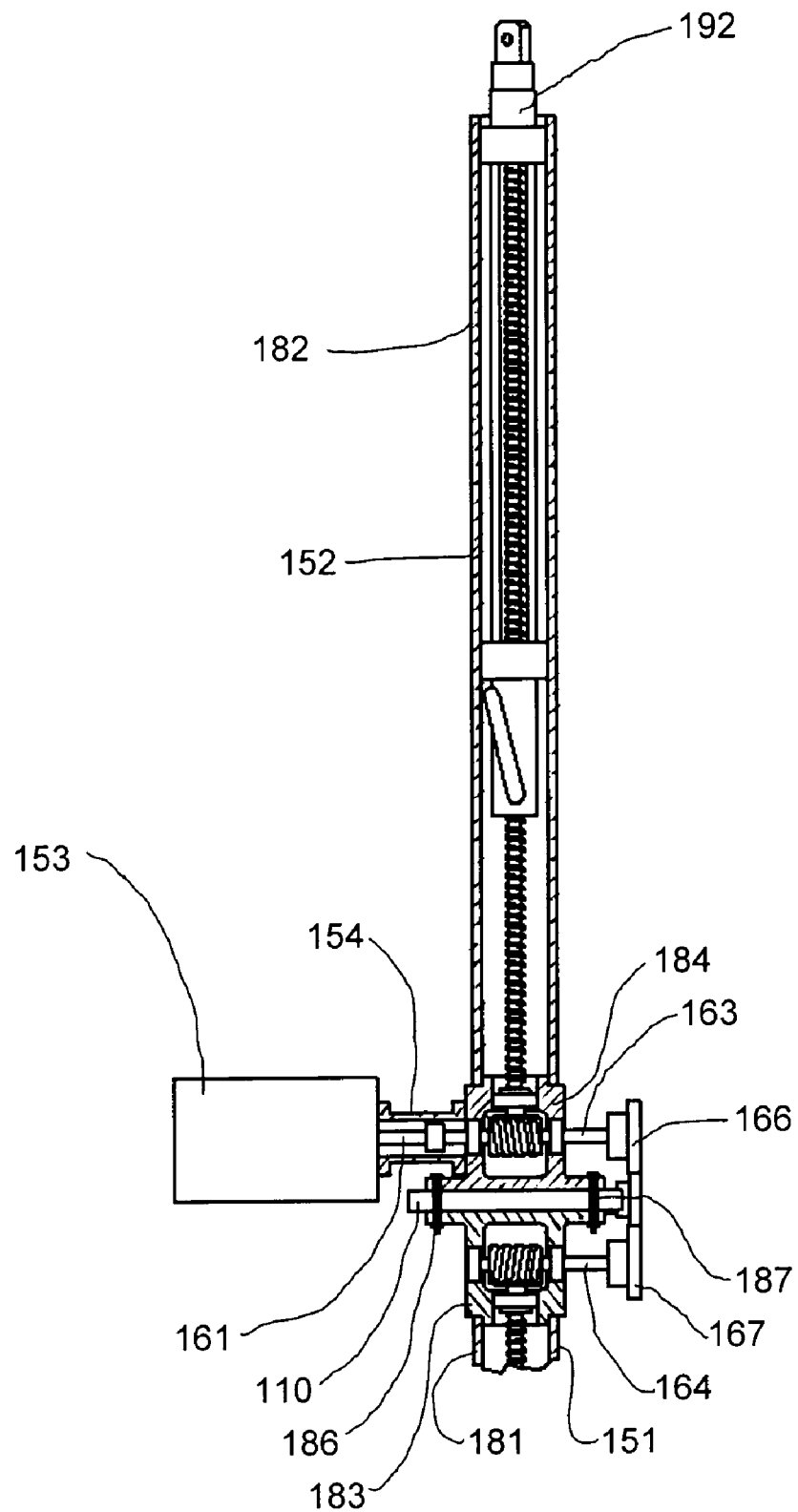
FIG. 14 is a longitudinal section of one of the screw type linear actuators employed to raise and lower the lift linkages.

Referring 7, the double scissors linkages 42, 43 are shown in a raised position which is effected by simultaneous contraction of a pair of end to end screw type linear actuators 151, 152 which are driven by an electric motor 153. As shown in FIG. 10, the electric motor 153 is connected to a drive shaft housing 154 which in turn is supported on the H beam 92 and secured to the linear actuator 152. The drive shaft 161 of the electric motor 153 is connected in driving relation to a worn gear shaft 163 of the screw type linear actuator 152. As shown in FIGS. 8, 9 and 14 the shaft 163 is drivingly connected to the worn gear shaft 164 of linear actuator 151 by an endless drive chain 160 passing over sprockets 166, 167 secured to the shafts 163, 164 respectively, and over an idler sprocket 168 by which the tension of the drive chain 160 is adjusted. The linear actuators 151, 152 are extended at the same rate by the drive motor 153. The linear actuators 151, 152 include identical outer cylinders 181, 182, respectively, rigidly secured to end mounts 183, 184 of the same construction which are rigidly secured to the vertical plate 110 by bolt and nut fasteners 186, 187. Referring also to FIG. 9, the actuators 151, 152 have extendable cylindrical thrust transmitting members 191, 192 which are pivotally connected at their outer ends to upstanding arms 193, 194 of a pair of identical dollies 196, 197, respectively. Referring to FIG. 13, the dolly 196 includes a pair of parallel vertical walls 201, 202 rigidly interconnected by cross braces 203, 204 welded thereto. A horizontal strut 206 between mid section of the vertical side walls 201, 202 is welded at its opposite ends to the braces 203, 204, respectively. A pair of laterally spaced parallel vertical connector plates 208, 209 are welded at their lower ends to the horizontal strut 206 and are braced by triangular brackets 211, 212 welded to the plates 208, 209, respectively, and to the cross brace 204. A first set of aligned bores 213 are formed in upwardly extending ears on the connector plates 208, 209. A second set of bores 214, only one of which is shown in FIG. 13, are formed below and parallel to the bores 213, 214, to permit both actuators 151, 152 to extend parallel to one another. As will be noted in the drawings, linear actuator 151 is rotated 180 degrees in relation to the linear actuator 152 and due to the manufacturer's eccentric positioning of the four mounting bores in the end mounts 183, 184 of the identical actuators 181, 182, actuator 151 is higher than actuator 152. The dolly 196 includes four upper rollers 216 and four lower rollers 217 pivotally mounted on the side walls 201, 202 on parallel horizontal axes which serve to guide the dolly 196 on the formed by the coplanar horizon confronting lower flanges 221, 222 of the H beams 92, 93. The side walls 201, 202 of the dolly 196 include downwardly extending portions near its longitudinal end, remote from the actuator connecting holes 213, to which a transverse horizontal pivot pin 226 is welded so as to have end portions extending horizontally outward for pivotal connection with the upper ends the uppermost links of lift linkages 42, 43.

Figure 7:
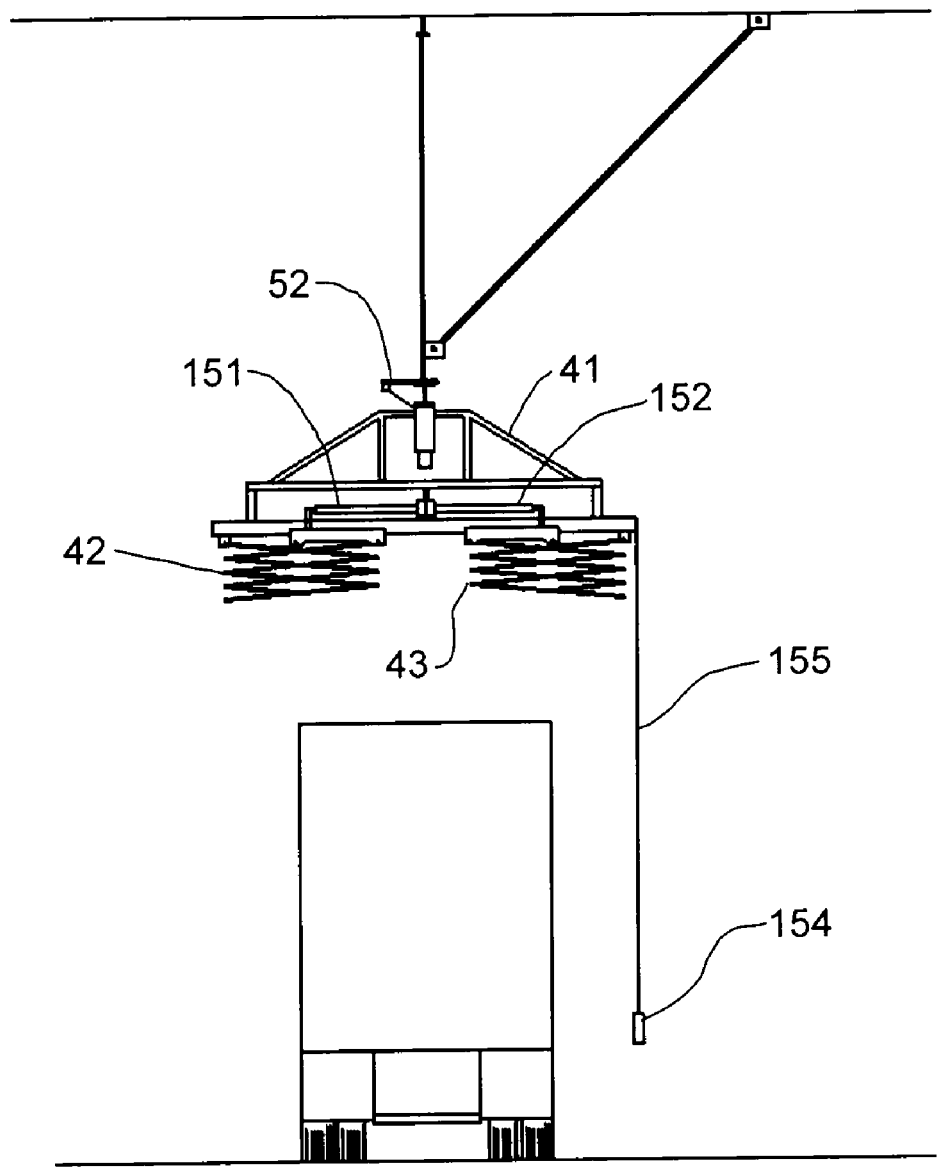
FIG. 7 is an end view of trailer and the trolley supported scissors lift linkage in its raised position.

As shown in FIG. 10, the pivot pin 226 pivotally supports the upper ends of inner links 230, 231. Each of the multiple scissors linkage units 42, 43 is made up of a plurality of sets of centrally crossed inner and outer parallel links pivoted to one another at their crossing. The inner links 230, 231 are pivotally connected to a pair of outer links 233, 234, respectively, by a cylindrical pivot pin 236. The upper ends of outer links 233, 234 are pivotally connected to a horizontally pivot pin 238 secured to downward extending brackets 239, 241 welded to the under side of the H beams 92, 93. It will be noted that the links 233, 234 are spaced a substantial horizontal distance from one another and the same is true of the links 230, 231. By use of long pivot pins 226, 236, 238 and by use of braces 243, 244 extending between and rigidly secured to the inner links 230, 231 between corresponding end portions of the inner links 230, 231 a double scissors lift linkage is provided which is strong enough to tow a heavy tarpaulin connected to the lower end of a lower pair of the double scissors lift linkages 42, 43. Appropriate releasable connectors 251 are connected to the laterally outer ends of the lower most links of the two sets of linkages and are attachable to laterally opposite corners of one end of the tarpaulin. As shown in FIG. 7, hand held controls 154 are provided for operating the trolley drive motor 44, the linear actuator drive motor 153, and the reel drive motor 58. The herein described tarpaulin handling apparatus affords faster installation with less labor. Furthermore, the tarpaulins stay in service longer because of their reduced damage in use.

What is claimed is:

1. A tarping apparatus for tarping cargo resting on a ground supported cargo transport vehicle, comprising:

a lifting and towing apparatus adapted for connection to one end of a tarpaulin including an elongated horizontal overhead track positioned above and longitudinally of said vehicle parked beneath said track, a trolley supported on said track for fore and aft horizontal movement in the direction of said track including an elongated horizontal lift support structure including parallel beams extending laterally in opposite directions in relation to said track, a vertically extendible and contractible scissors linkage depending from each of the laterally opposite ends of said beams, each of said linkages including a plurality of sets of cross connected links, said sets being connected in a vertical sequence with the upper end of one of said links of the uppermost set of links of said linkages being pivotally connected, respectively, to the associated one of the laterally opposite end of said beams, and a pair of laterally extending power operated linear actuators operatively interposed between said trolley and the upper end of another link of said upper most set of links of said scissors linkages, respectively, said lower ends of said scissors linkages being adapted for releasable connection to laterally opposite corners of one end of a tarpaulin.

2. The tarping apparatus of claim 1 including a link chain alongside the underside of said track having opposite ends secured to the opposite ends of said track and a power driven sprocket on said trolley meshing with said link chain.

3. The tarping apparatus of claim 2 including an electric motor on said trolley driving said sprocket and an electric line connected to electric motor supported in a festoon manner by carriages connected to a guide rail supported by and parallel to said track.

4. The tarping apparatus of claim 1 wherein said linear actuators are screw type actuators.

5. The tarping apparatus of claim 4 wherein said screw type actuators are positioned end to end and are powered by a single electric motor.

6. The tarping apparatus of claim 5 wherein said linear actuators each include a cylinder and a rod, a connector connecting said rods to said upper end of said other link of said uppermost set of links of said scissors linkages, respectively.

7. The tarping apparatus of claim 6 wherein said connector includes a dolly with wheels supported for lateral horizontal movement on said beams of said lift support structure.

8. The tarping apparatus of claim 7 wherein said beams present horizontally confronting parallel flanges and said wheels of said dollies are in guided engagement with said flanges.

9. The tarping apparatus of claim 8 including a hand held control for controlling operation of said electric motors.

10. The tarping apparatus of claim 1 wherein each set of said scissor linkages includes matched pairs of cross connected linkages with each matched pair of linkages including an inside link and outside link pivotally connected to one another at their midpoints, the outside links being in parallel relation to one another, the inside links being parallel to one another and also in confronting relation to one another and horizontal cross braces extending between and rigidly secured to said inside links of each of said sets of linkages.

11. The tarping apparatus of claim 10 wherein said inside links of each set of links are spaced horizontally from one another at least a distance greater than one third their length.

12. A tarpaulin roller apparatus for elevating said a tarpaulin during tarping of cargo resting on a ground supported cargo transport vehicle comprising:
an overhead support extending laterally in relation to the direction of travel of said cargo transport vehicle,
a tarpaulin roller carrier extending horizontally and parallel to said overhead support,
a cable drum rotatably supported on each lateral end of said overhead support for rotation about a laterally extending horizontal axis,
an electric motor on said overhead support connected in driving relation to said drums,
a cable secured to and reeved about each of said drums, said cables extending downward and having ends connected to said tarpaulin roll carrier and
a laterally extending tarpaulin roller rotatably supported on said carrier.

13. The tarpaulin roller apparatus of claim 12 including a laterally extending protection bar connected to said roll carrier below and parallel to said tarpaulin roller.

14. The tarpaulin roller apparatus of claim 13 including a tie down connected to each lateral side of said tarpaulin roll carrier adapted to connection to said cargo transport vehicle.

15. A tarping apparatus for tarping cargo resting on a ground supported cargo transport vehicle, comprising:
a lifting and towing apparatus adapted for connection to one end of a tarpaulin including
an elongated horizontal overhead track positioned above and longitudinally of said vehicle parked beneath said track,
a trolley supported on said track for fore and aft horizontal movement in the direction of said track including an elongated horizontal lift support structure including parallel beams extending laterally in opposite directions in relation to said track,
a vertically extendible and contractible scissors linkage depending from each of the laterally opposite ends of said beams, each of said linkages including a plurality of sets of cross connected links, said sets being connected in a vertical sequence with the upper end of one of said links of the uppermost set of links of said linkages being pivotally connected, respectively, to the associated one of the laterally opposite end of said beams, and
a pair of laterally extending power operated linear actuators operatively interposed between said trolley and the upper end of another link of said upper most set of links of said scissors linkages, respectively, said lower ends of said scissors linkages being adapted for releasable connection to laterally opposite corners of one end of a tarpaulin and
a tarpaulin roller apparatus for elevating said tarpaulin during tarping of said cargo including:
an overhead support extending laterally in relation to the direction of travel of said vehicle,
a tarpaulin roller carrier extending horizontally and parallel to said overhead support,
a cable drum rotatably supported on each lateral end of said overhead support for rotation about a laterally extending horizontal axis,
an electric motor on said overhead support connected in driving relation to said drums,
a cable secured to and reeved about each of said drums, said cables extending downward and having ends connected to said tarpaulin roll carrier and
a laterally extending tarpaulin roller rotatably supported on said carrier on a horizontal axis.

\* \* \* \* \*